United States Patent
Asai et al.

(10) Patent No.: US 8,613,862 B2
(45) Date of Patent: Dec. 24, 2013

(54) METHOD FOR MANUFACTURING LIQUID DISCHARGE HEAD SUBSTRATE

(75) Inventors: Kazuhiro Asai, Kawasaki (JP); Hirokazu Komuro, Yokohama (JP); Satoshi Ibe, Yokohama (JP); Takuya Hatsui, Tokyo (JP); Shimpei Otaka, Yokohama (JP); Hiroto Komiyama, Tokyo (JP); Keisuke Kishimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 962 days.

(21) Appl. No.: 12/203,612

(22) Filed: Sep. 3, 2008

(65) Prior Publication Data

US 2009/0065472 A1 Mar. 12, 2009

(30) Foreign Application Priority Data

Sep. 6, 2007 (JP) ................................ 2007-231335

(51) Int. Cl.
*G01D 15/00* (2006.01)
*G11B 5/127* (2006.01)

(52) U.S. Cl.
USPC ...... 216/27; 216/2; 216/39; 438/29; 438/320; 438/401; 438/48; 438/706

(58) Field of Classification Search
USPC ........... 216/27, 2; 438/733, 706, 320, 48, 401
See application file for complete search history.

(56) References Cited

U.S. PATENT DOCUMENTS

| | | | | |
|---|---|---|---|---|
| 5,894,091 | A * | 4/1999 | Kubota | 73/504.12 |
| 6,648,454 | B1 * | 11/2003 | Donaldson et al. | 347/65 |
| 6,805,432 | B1 | 10/2004 | Milligan et al. | |
| 7,066,581 | B2 * | 6/2006 | Conta et al. | 347/65 |
| 7,250,113 | B2 | 7/2007 | Komuro et al. | |
| 2008/0076197 | A1 | 3/2008 | Komuro et al. | |
| 2008/0094454 | A1 | 4/2008 | Koyama et al. | |
| 2009/0065473 | A1 | 3/2009 | Ibe et al. | |
| 2009/0065476 | A1 | 3/2009 | Komiyama et al. | |
| 2009/0065481 | A1 | 3/2009 | Kishimoto et al. | |
| 2009/0065482 | A1 | 3/2009 | Komiyama et al. | |

* cited by examiner

*Primary Examiner* — Duy Deo
*Assistant Examiner* — Erin Bergner
(74) *Attorney, Agent, or Firm* — Fitzpatrick, Cella, Harper & Scinto

(57) ABSTRACT

A manufacturing method, for a liquid discharge head substrate that includes a silicon substrate in which a liquid supply port is formed, includes the steps of: preparing the silicon substrate, on one face of which a mask layer, in which an opening has been formed, is deposited; forming a first recessed portion in the silicon substrate, so that the recessed portion is extended through the opening from the one face of the silicon substrate to the other, reverse face of the silicon substrate; forming a second recessed portion by performing wet etching for the substrate, via the first recessed portion, using the mask layer; and performing dry etching for the silicon substrate in a direction from the second recessed portion to the other face.

15 Claims, 11 Drawing Sheets

METHOD FOR MANUFACTURING LIQUID DISCHARGE HEAD SUBSTRATE

BACKGROUND OF THE INVENTION

1. Field of the Invention

The present invention relates to a method for manufacturing a liquid discharge head substrate, to be employed for a liquid discharge head.

2. Description of the Related Art

Well known liquid discharge heads are the descriptively named inkjet heads that today are so often employed in printers to discharge ink. Generally, for such an inkjet head, a substrate is provided that includes: discharge ports, through which ink is to be discharged; energy generation elements, used to generate the energy required for the discharge of ink through the discharge ports; an ink supply port, to which and through which ink is to be supplied; and ink flow passageways, which communicate with the ink supply port and the discharge ports and along which ink is supplied to the discharge ports. The discharge ports, the energy generation elements and the ink flow passageways are arranged on the obverse face of the substrate, while the ink supply port is an opening, an ink passageway, leading from the reverse to the obverse side of the substrate. Thus, ink can be supplied from the reverse of the substrate to the ink flow passageways and, impelled by a driving force engendered by energy generation elements located along these paths, discharged through the discharge ports.

A requirement for a head substrate having the above arrangement, to facilitate the downsizing of the substrate and to stabilize the discharge function, is that on the reverse of the substrate the supply port opening width (hereinafter referred to as a reverse opening width) be narrowed. And when multiple ink supply ports are to be formed in a substrate, narrowing their reverse opening widths becomes especially important.

To form an ink supply port that passes through a substrate, orientation-dependent anisotropic wet etching is employed; however, with this method, anisotropy consonant with crystal orientation occurs between the direction of the depth of etching and the direction of the width. FIG. 11 is a schematic, cross-sectional view of a head substrate manufactured using a conventional method. Referring to FIG. 11, the reverse opening width of a supply port 34 formed in a substrate 30 is determined by the width of the substrate 30 obverse side opening (hereinafter referred to as an obverse opening width). For example, when the substrate 30 is made of silicon, and when the obverse opening width is $W_2$, the thickness of the substrate 30 is D and the reverse opening width is $W_1$, the reverse opening width $W_1$ is determined by the relation equation $W_1=W_2+2D/\tan 54.7°$.

Therefore, in order to reduce the reverse opening width $W_1$, either the obverse opening width $W_2$ must be narrowed, or the thickness D of the substrate 30 must be reduced.

Therefore, proposed in U.S. Pat. No. 6,805,432 is a head substrate manufacturing method according to which, to reduce the reverse opening width, neither a narrowing of the obverse opening width nor a reduction in the thickness of the substrate is required.

The manufacturing method described in U.S. Pat. No. 6,805,432 is one whereby a non-perforating hole is formed using a mask, formed on the reverse of a substrate and by performing anisotropic dry etching, and thereafter, an ink supply port is formed using the same mask and by performing orientation-dependent anisotropic wet etching.

According to U.S. Pat. No. 6,805,432, the manufacturing method disclosed therein will form an ink supply port having a smaller reverse opening width than a case wherein an ink supply port having the same obverse opening width is formed by performing only orientation-dependent anisotropic wet etching.

However, in order for the obverse opening width to be increased without the reverse opening width being changed, the amount of material removed by anisotropic dry etching must be increased. In other words, the depth to which anisotropic dry etching is performed must be greater. However, when the amount of material to be removed by anisotropic dry etching is increased, the etching period is extended and inkjet head substrate productivity is reduced. On the other hand, when the substrate is thinned to reduce the etching period, the strength of the substrate would be reduced.

SUMMARY OF THE INVENTION

While taking the above problems into account, one objective of the present invention is to provide an inkjet head substrate wherein the opening width of an ink supply port has been reduced without adversely affecting productivity and strength.

According to one aspect of the invention, a manufacturing method, for a liquid discharge head substrate that includes a silicon substrate in which a liquid supply port is formed, comprises the steps of: preparing the silicon substrate, on one face of which a mask layer, in which an opening has been formed, is deposited; forming a first recessed portion in the silicon substrate, so that the recessed portion is extended through the opening from the one face of the silicon substrate to the other, reverse face of the silicon substrate; forming a second recessed portion by performing wet etching for the substrate, via the first recessed portion, using the mask layer; and performing dry etching for the silicon substrate in a direction from the second recessed portion to the other face.

According to the present invention, since the opening width of the ink supply port of the head substrate is narrowed, the head substrate can be downsized and a discharge function better stabilized.

Further features of the present invention will become apparent from the following description of exemplary embodiments with reference to the attached drawings.

DESCRIPTION OF THE EMBODIMENTS

The feature of a liquid discharge head substrate manufacturing method according to the present invention is that orientation-dependent anisotropic wet etching and anisotropic dry etching are performed, step by step, for a substrate wherein a non-perforating hole has been formed, and an ink supply port is formed that extends from the reverse to the obverse surface of the substrate.

A detailed description will now be given, while referring to the accompanying drawings, for the liquid discharge head substrate manufacturing method according to individual embodiments of the present invention.

First Embodiment

Figure 1:
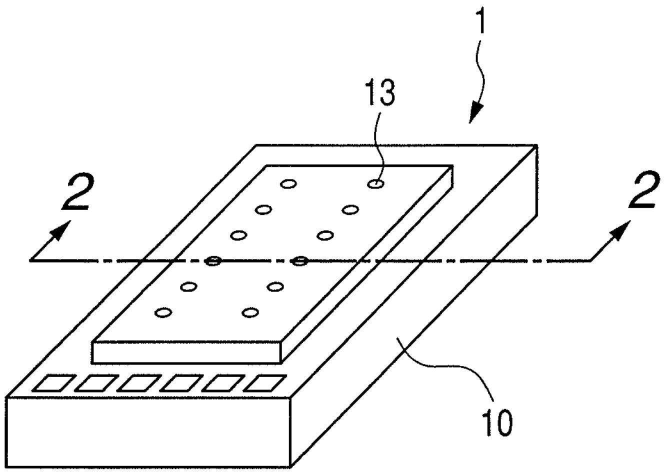
FIG. 1 is a schematic perspective view of one part of a head substrate produced by a head substrate manufacturing method according to a first embodiment.
Figure 2:
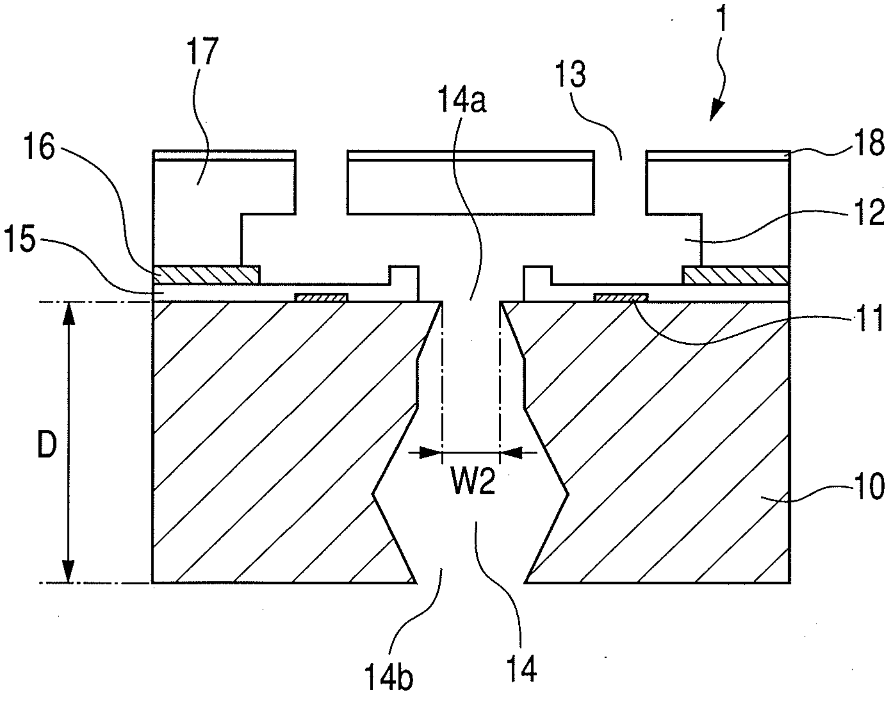
FIG. 2 is a schematic cross-sectional view of the head substrate illustrated in FIG. 1.

For the sake of convenience, a descriptive overview will be given for a liquid discharge head substrate produced using a liquid discharge head substrate manufacturing method of a first embodiment of this invention, and the structure of a liquid discharge head for which this substrate is employed. FIG. 1 is a schematic perspective view of an inkjet head substrate 1, an example liquid discharge head produced using the manufacturing method of the first embodiment. And FIG. 2 is a cross-sectional view of the inkjet head substrate 1 taken along line 2-2 in FIG. 1.

The inkjet head substrate 1 (hereinafter referred to also as a head substrate) includes a silicon substrate 10, on the obverse side of which are formed multiple energy generation elements 11, such as heaters, and ink flow passageways 12 and discharge ports 13. Further, an ink supply port 14 passes through the silicon substrate 10, opening out on both the obverse and reverse sides.

More specifically, the energy generation elements 11 are arranged in two arrays, at predetermined pitches, on the obverse face of the silicon substrate 10. Further, a passivation layer (a protective layer) 15 is deposited on the obverse face of the silicon substrate 10, and covers the energy generation elements 11. Furthermore, a polyether amide layer (an adhesive layer) 16 and a photosensitive resin layer 17 are overlaid on the passivation layer 15 in the named order, and the ink flow passageways 12 and the discharge ports 13 are formed in the photosensitive resin layer 17. That is, the photosensitive resin layer 17 serves as a flow passageway formation member or as a nozzle formation member. A water repellent layer 18 is also formed on the photosensitive resin layer 17. And although not shown in FIG. 1, wiring and circuits for driving the energy generation elements 11 are also provided for the obverse face of the silicon substrate 10.

According to the inkjet head substrate 1 having the above described structure, a driving force engendered by the energy generation elements 11 is applied to ink (not shown) that has been supplied through the ink supply port 14 to the ink flow passageways 12, and ink droplets are discharged through the discharge ports 13. This inkjet head substrate 1 can be applied for an inkjet recording head that is to be mounted in an apparatus, such as a printer, a copier, a facsimile machine that includes a communication system or a word processor that includes a printer unit, and an industrial multifunctional recording apparatus that can provide the functions of various types of processing apparatuses. When an inkjet recording head in which the inkjet head substrate 1 is incorporated is employed, recording is enabled for various recording media, such as paper, yarn, fiber, leather, metal, plastic, glass, woods and ceramics. For this invention, "recording" is defined not only as the production of an image, such as a character or a figure, used to convey a specific message when provided on a recording medium, but also an image, such as a pattern, that conveys no material message when likewise provided.

Figure 3A:
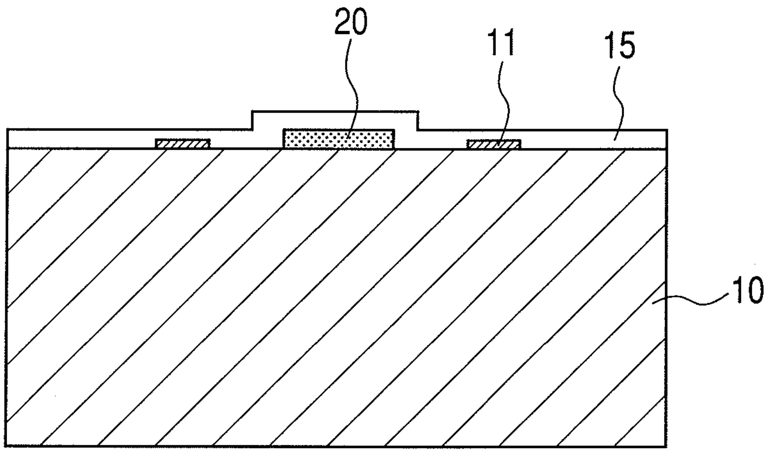
FIGS. 3A, 3B, 3C, 3D, 3E, 3F, 3G, 3H, 3I, 3J and 3K are schematic cross-sectional views of the processing performed using the head substrate manufacturing method according to the first embodiment.

Next, the method for manufacturing the inkjet head substrate 1 illustrated in FIGS. 1 and 2 will now be described. As illustrated in FIG. 3A, the silicon substrate 10 is prepared whereon formed, on the obverse face, are the energy generation elements 11, and wiring and circuits (neither illustrated) for driving the energy generation elements 11.

Sequentially, a first passivation layer 20 is deposited on the obverse face of the silicon substrate 10. This first passivation layer 20 should be positioned only across one portion of the obverse face of the silicon substrate 10, in consonance with an opening (obverse opening 14*a*) of the ink supply port 14 on the obverse face side of the silicon substrate 10 illustrated in FIG. 2. Further, the first passivation layer 20 should be made of a material, such as Al, which is inactive relative to halogen gases, and for which an etching selection ratio relative to silicon can be obtained during anisotropic dry etching performed using the halogen gas.

Thereafter, a second passivation layer 15 is formed entirely across the obverse face of the silicon substrate 10, covering the first passivation layer 20. At this time, the second passivation layer 15 corresponds to the passivation layer 15 illustrated in FIG. 2. This second passivation layer 15 should be formed of a material, such as silicon nitride, for which selective removal relative to the first passivation layer 20 is enabled. In addition, an $SiO_2$ film (not illustrated) is deposited across the entire reverse face of the silicon substrate 10. The order in which the second passivation layer 15 and the $SiO_2$ film are formed may be inverted.

Figure 3B:
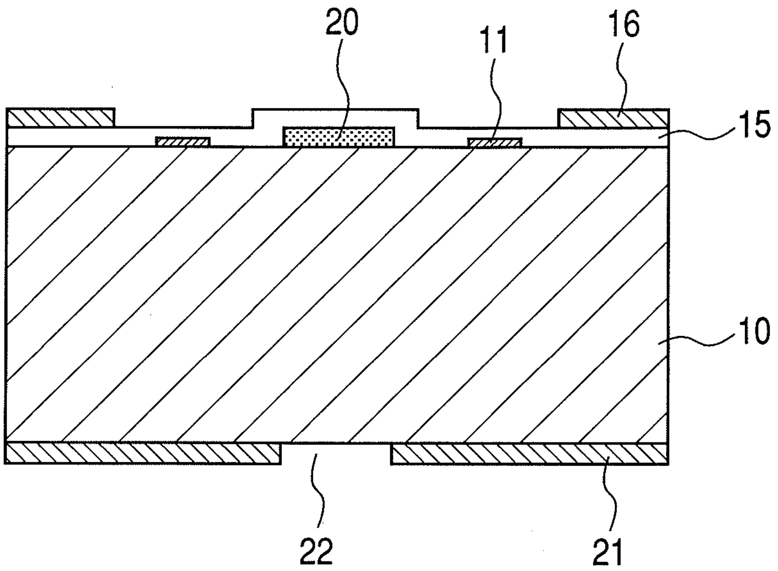

Following this, as illustrated in FIG. 3B, a polyether amide resin is applied to the obverse and reverse faces of the silicon substrate 10, and is cured by baking. Thus, polyether amide layers (not illustrated) can be obtained on either face. Thereafter, a positive-type resist is applied, using spin coating, to the polyether amide layer formed on the obverse face of the silicon substrate 10, which is exposed and developed. Then, the positive-type resist is patterned by dry etching, and is removed, so that the adhesive layer 16 is obtained. Likewise, a positive-type resist is applied, using spin coating, to the polyether amide layer formed on the reverse face of the silicon substrate 10, and is exposed and developed. Then, the positive-type resist is patterned using dry etching and is removed, so that an etching mask 21 is obtained. The thickness of the etching mask 21 should be based on the resistance to the anisotropic dry etching to be performed at the succeeding step. During this patterning process, an opening 22 is formed in the etching mask 21 in consonance with an opening (reverse opening 14*b*) of the ink supply port 14 on the reverse side of the silicon substrate 10 illustrated in FIG. 2.

Figure 3C:
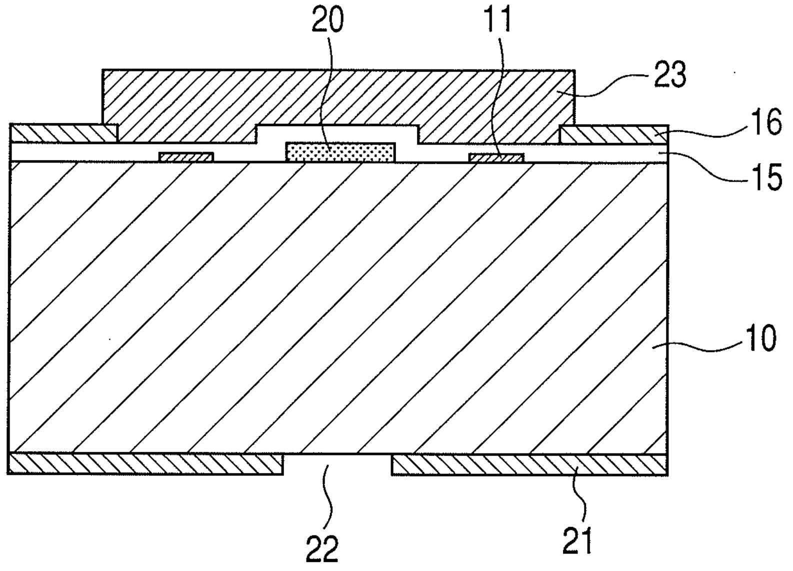

Sequentially, as illustrated in FIG. 3C, a positive-type resist 23, which is a mold material used for the ink flow passageways 12 (FIG. 2), is patterned on the obverse face of the silicon substrate 10.

Figure 3D:
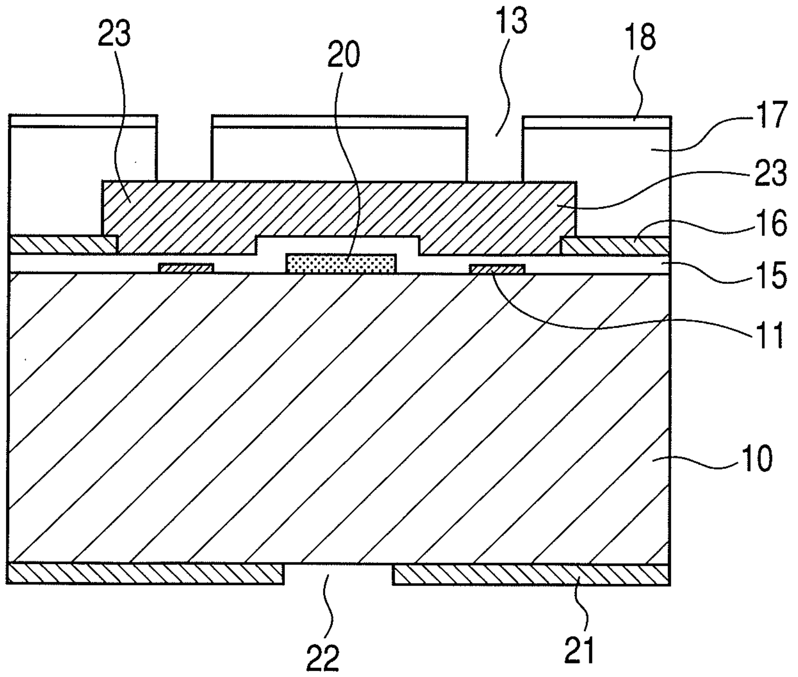

Then, as illustrated in FIG. 3D, a photosensitive coating resin is applied to the positive-type resist 23 using spin coating, and the photosensitive coating resin layer 17 is obtained that becomes a flow passageway formation member. In addition, a water repellent dry film is laminated on the photosensitive coating resin layer 17, forming the water repellent layer 18. And thereafter, the photosensitive coating resin layer 17 is exposed and developed using ultraviolet light or Deep-UV light, for example, and is patterned. As a result, the discharge ports 13 are formed.

Figure 3E:
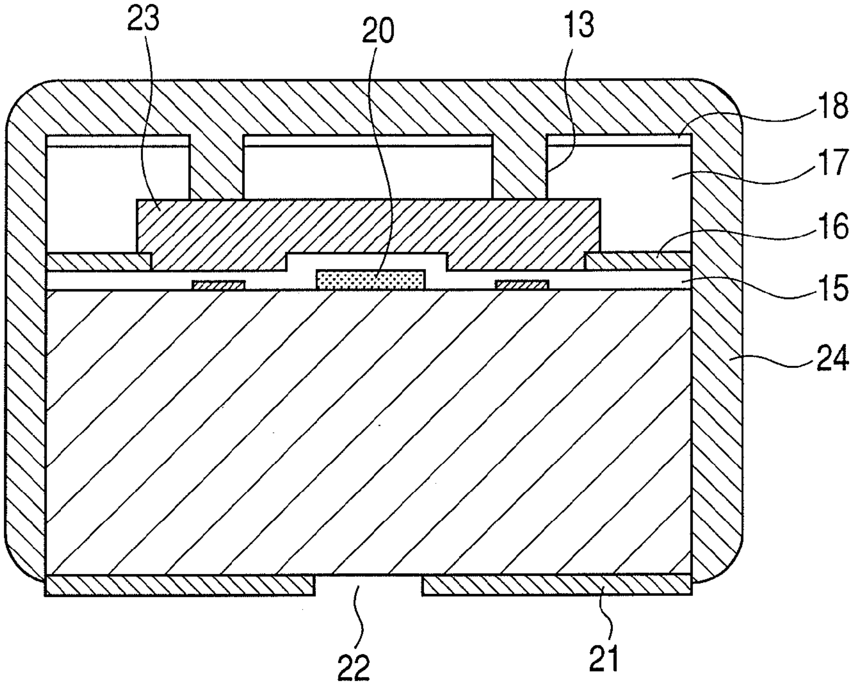

Following this, as illustrated in FIG. 3E, a protective member 24 is formed to cover using spin coating the obverse face and the side faces of the silicon substrate 10 where the positive-type resist 23 and the photosensitive coating resin layer 17 have been formed.

Figure 3F:
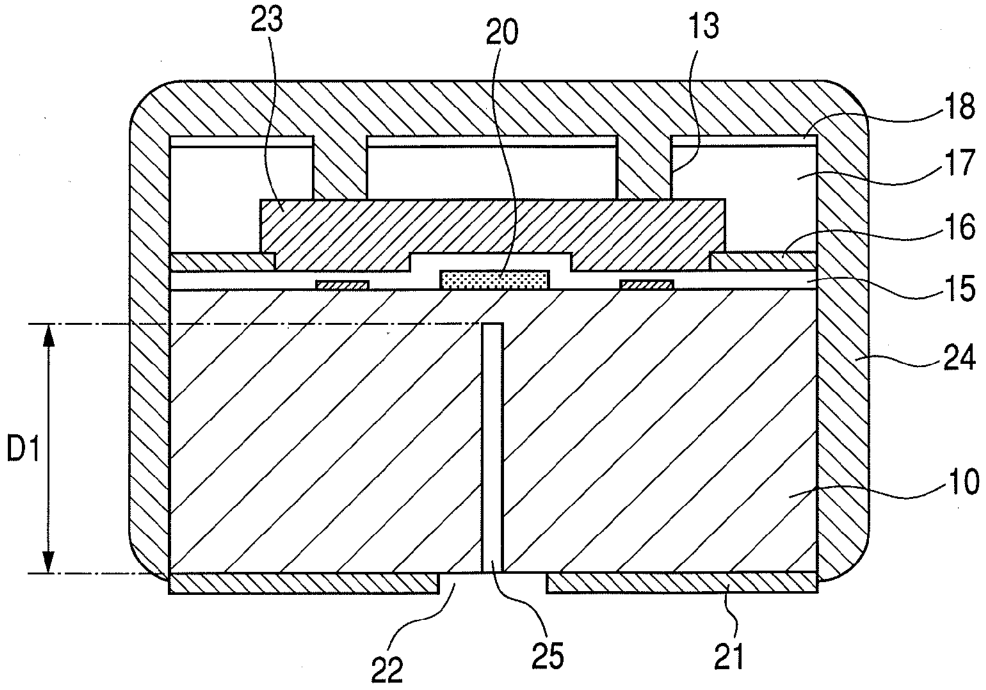

Thereafter, as illustrated in FIG. 3F, a guide hole 25, which is a first recessed portion, is formed in the opening 22 of the etching mask 21. Specifically, multiple guide holes 25 are formed from the reverse face of the silicon substrate 10, which is exposed at the opening 22, toward the obverse face. It should be noted that the opening 22 of the etching mask 21 is rectangular, and the size in the lateral direction (the direction of the width) is 100 μm.

Figure 4A:
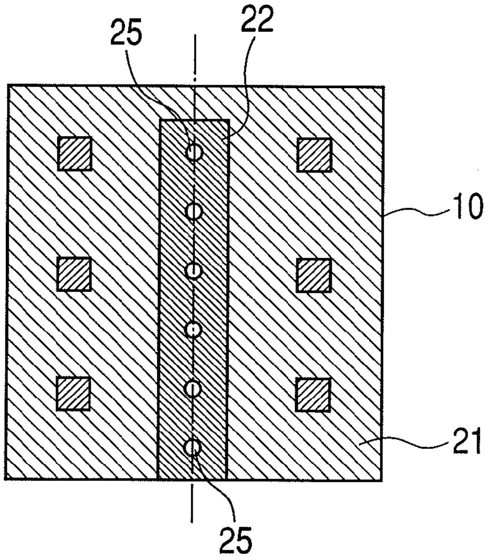
FIGS. 4A and 4B are schematic plan views of the processing performed using the head substrate manufacturing method according to the first embodiment.

FIG. 4A is a schematic plan view of the reverse face of the silicon substrate 10 in which non-perforating holes, i.e., the guide holes 25, are formed in the above described manner. As illustrated in FIG. 4A, the individual guide holes 25 are arranged in a line at pitches of 100 μm along the lateral (widthwise) center line of the opening 22 formed in the etching mask 21. That is, one array of the guide holes 25 is formed along the center line, in the direction of the width of the first passivation layer 20, and in consonance with a direction in which the discharge ports 13 are arranged.

In this embodiment, laser processing is performed to arrange the array of the guide holes 25. Specifically, third harmonic generation light (THG: wavelength of 355 nm) emitted by a YAG laser is employed, and the power and the frequency of the laser light are set to appropriate values. Further, the diameter of each guide hole 25 is set to about ϕ40 μm. It is preferable that the diameter of the guide holes 25 be within a range between about ϕ5 to 100 μm. When the diameters of the guide holes 25 are too small, an etchant can not enter the guide holes 25 during the orientation-dependent anisotropic wet etching process that is to be performed later. On the contrary, when the diameters of the guide holes 25 are too large, it takes time to form guide holes 25 of a predetermined depth, and productivity is deteriorated. It should be noted that, when the diameter for the guide holes 25 is increased, a processing pitch should be designated that will prevent the overlapping of adjacent guide holes 25.

The thickness of the silicon substrate 10 is 625 μm, and from the viewpoint that the processing speed for forming an ink supply port should be increased, it is preferable that the depth of the guide holes 25, which are the recessed portions that do not pass through the silicon substrate 10, be equal to or greater than 50% of the thickness of the silicon substrate 10. In this embodiment, the depth for the guide holes 25 is preferably within a range of 420 to 460 μm.

As described above, third harmonic generation light (THG: wavelength of 355 nm) emitted by a YAG laser has been employed for forming the guide holes 25. However, so long as silicon used for the silicon substrate 10 can be processed to make holes, the wavelength of the laser beam used for the processing is not limited to this wavelength. For example, second harmonic generation light (SHG: wavelength of 532 nm) emitted by a YAG laser may also be employed to form the guide holes 25, because as well as the THG light, the SHG light provides a high absorption rate relative to silicon. It should be noted, however, that the boring method used to form the guide holes 25 is not limited to the laser processing method.

After the formation of the guide holes 25 has been completed, a portion of the $SiO_2$ film (not illustrated) deposited on the reverse of the silicon substrate 10 and exposed at the opening 22 in the etching mask 21 is removed, and the Si face of the silicon substrate 10 is exposed where the orientation-dependent anisotropic wet etching is to be started. Thereafter, the silicon substrate 10, with the etching start face exposed, is immersed in the etchant, and the etching process for forming the ink supply port 14 illustrated in FIG. 2 is started.

Figure 3G:
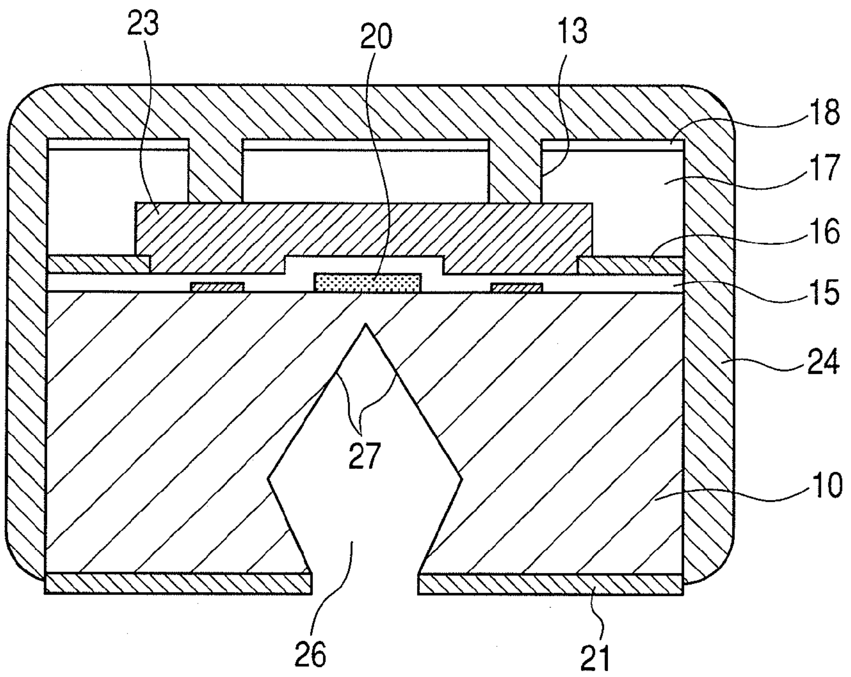

When the silicon substrate 10 wherein the guide holes 25 are formed is immersed in the etchant, the etchant enters the guide holes 25, and etching progresses in accordance with the crystal orientation of the silicon substrate 10. Therefore, the silicon substrate 10 is etched along the side walls with the bottoms of the guide holes 25 being the apexes, and when the {111} plane is exposed, the speed of the etching process is extremely slowed. As a result, a second recessed portion 26 having a rhombic shape with an open end in cross section, as illustrated in FIG. 3G, is formed in the silicon substrate 10. The second recessed portion 26 is a recessed portion having a shape of groove, in which a top of the portion does not reach the obverse face of the substrate. The etchant used for this process is TMAH (tetra methyl ammonium hydroxide) solution. The inner walls of the second recessed portion 26 are along {111} planes that have an angle of 54.7° relative to the reverse face of the silicon substrate 10, and at this time, two faces 27, which are {111} planes, are inclined toward the reverse face of the silicon substrate 10. The etchant need not be limited to TMAH, and an alkaline solution such as KOH (diluted potassium hydroxide) can be employed that enables orientation-dependent anisotropic wet etching.

Figure 3H:
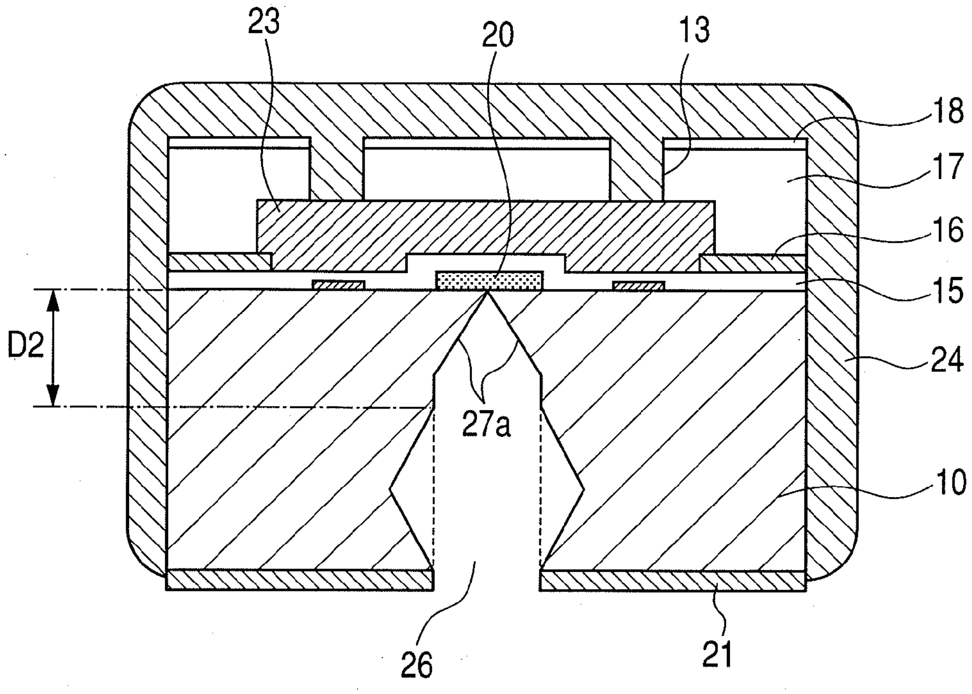

Sequentially, as illustrated in FIG. 3H, anisotropic dry etching is performed, toward the obverse face of the silicon substrate 10, from the inner walls (the bottom) of the second recessed portion 26 obtained by the orientation-dependent anisotropic wet etching, so that the second recessed portion 26 is penetrated to the obverse face of the substrate. In this process, a portion from the top of the second recessed portion 26 to the obverse face of the substrate 10 in the substrate 10 is etched. During this etching process, a trench structure is formed, using a halogen gas, by employing the Deep-RIE (Reactive Ion Etching) method. Furthermore, the etching mask 21 employed for the orientation-dependent anisotropic wet etching is also employed as an etching mask for this process.

While taking into account a depth D1 obtained by laser processing, i.e., the depth of the non-perforating holes 25, it is preferable that a depth D2 obtained by the anisotropic dry etching satisfy condition $D2>D-D1$, where D denotes the thickness of the silicon substrate 10.

Figure 3I:
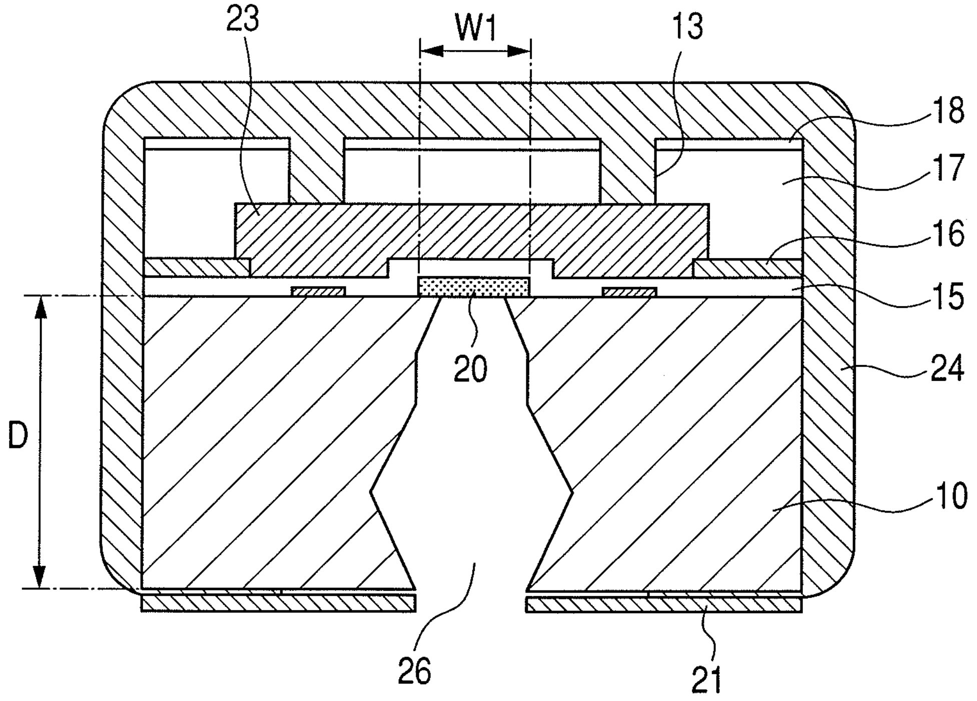
Figure 4B:
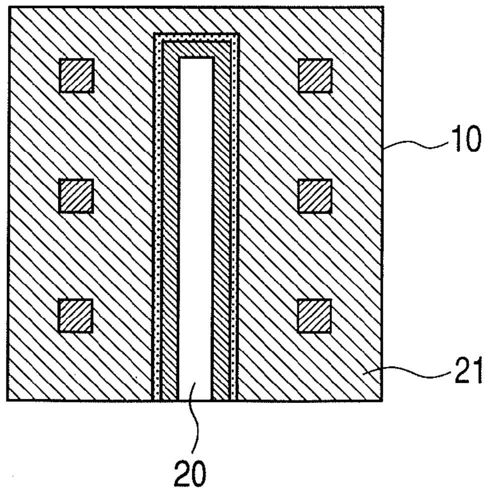

When anisotropic dry etching has been performed to satisfy the condition, as illustrated in FIGS. 3I and 4B, the etching process is halted at the first passivation layer 20. That is, the first passivation layer 20 functions as an etching stop layer. As previously described, a material, such as aluminum, that has a moderate dry etching resistance is appropriate for use as the first passivation layer 20. Furthermore, a metal layer is preferable as the first passivation layer 20 because the occurrence of notching can be prevented during dry etching, and an aluminum layer, which is very conductive, is especially preferable. The shape at the end of the recessed portion 26, formed by two faces 27, is substantially maintained through dry etching, and when the bottom portions reach the first passivation layer 20 deposited on the obverse face of the silicon substrate 10, the two faces 27 are changed to two faces 27*a* with {111} planes.

When W1≤W2 is established between a width W1 (FIG. 3I) of the first passivation layer 20 and an obverse opening width W2 (FIG. 2) of the ink supply port 14, it is preferable, while taking the depth D1 (FIG. 3F) obtained by laser processing into account, that the depth D2 (FIG. 3H) obtained by dry etching satisfy a relationship $D2 \le D - D1 + W1 (\tan 54.7°)/2$, where D is the thickness of the silicon substrate 10.

Figure 3J:
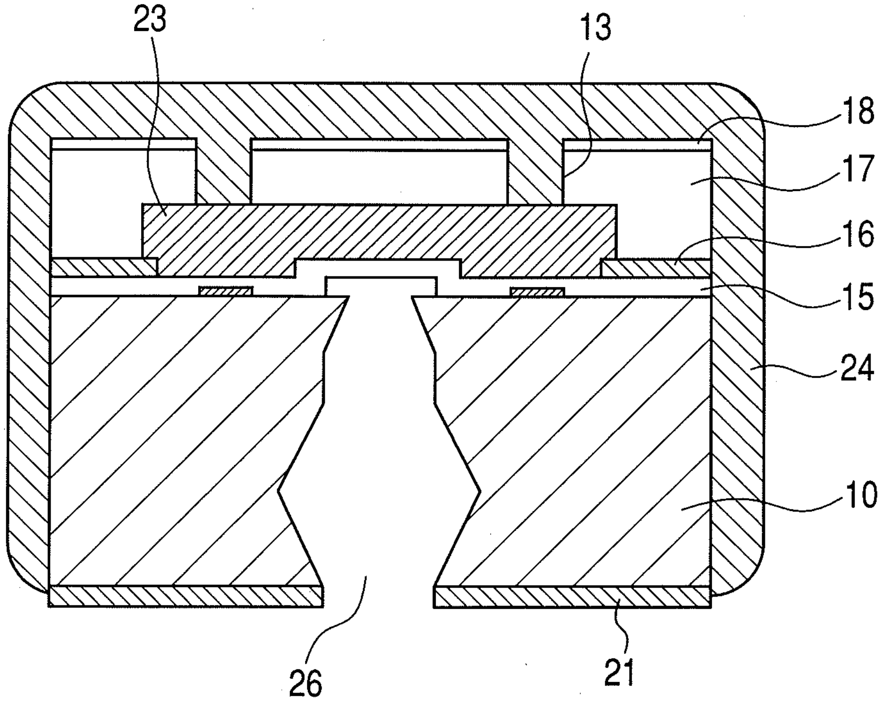

Sequentially, as illustrated in FIG. 3J, the first passivation layer 20 is removed using a solution consisting, for example, of an acid mixture that contains nitric acid, acetic acid and phosphoric acid, or by performing dry etching using a chlorine gas.

Figure 3K:
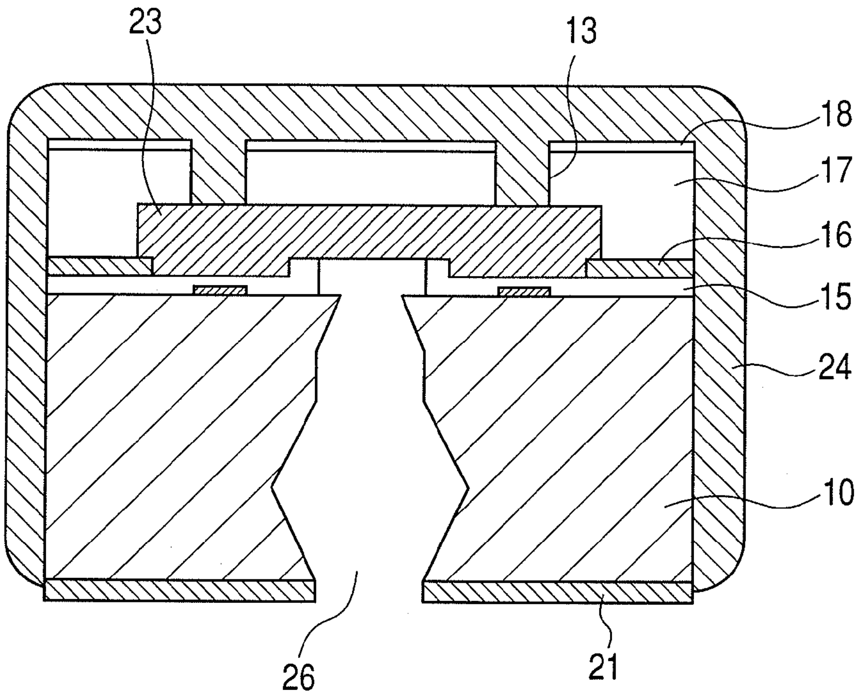

Following this, as illustrated in FIG. 3K, at least the portion of the second passivation layer 15 that overlaps the obverse opening 14*a* (FIG. 2) of the ink supply port 14 is removed by dry etching, and the positive-type resist 23 is exposed to the second recessed portion 26.

Thereafter, the etching mask 21 and the protective member 24 in FIG. 3K are removed, and the positive-type resist 23 is eluted through the second recessed portion 26. Then, the space from which the positive-type resist 23 was removed becomes the ink flow passageways 12 illustrated in FIG. 2, and the second recessed portion 26, which communicates with the ink flow passageways 12, becomes the ink supply port 14, as is also illustrated in FIG. 2.

Through the above described processing, the inkjet head substrate 1 illustrated in FIGS. 1 and 2 can be completed. Or more accurately, a silicon wafer on which multiple inkjet head substrates 1 are mounted can be completed. These inkjet head substrates 1 formed on the silicon wafer are cut into chips by a dicing saw, and electric wiring bonding is performed for the individual chips to drive the energy generation elements 11. Thereafter, chip tank members for supplying ink are connected to the individual chips, and the inkjet recording head units are completed.

In this embodiment, the inkjet head substrate 1 has been manufactured using a silicon substrate 10 that is 625 μm thick. However, a thinner or a thicker substrate may be employed for the head substrate manufacturing method of the present invention.

Furthermore, in this embodiment, a member used to form ink flow passageways 12 has been mounted on the silicon substrate 10 prior to the formation of ink supply port 14. However, the ink supply port 14 in a head substrate may be formed first, and then, members used to form the ink flow passageways 12 and the discharge ports 13 may be mounted thereon.

Second Embodiment

Figure 5:
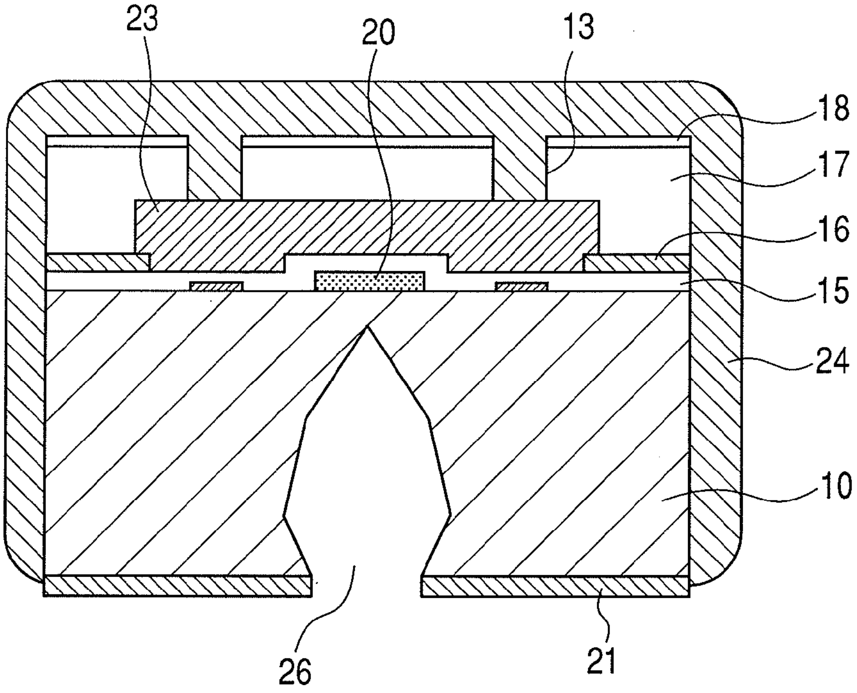
FIG. 5 is a schematic cross-sectional view of a head substrate produced by a head substrate manufacturing method according to a second embodiment of the present invention.
Figure 6:
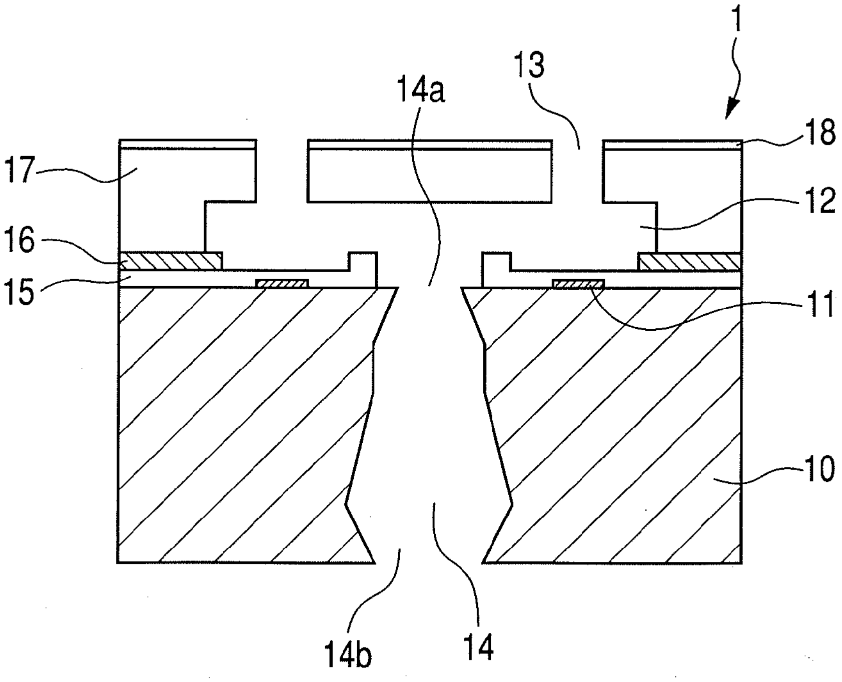
FIG. 6 is a schematic cross-sectional view of the processing performed using the head substrate manufacturing method according to the second embodiment.

A head substrate manufacturing method according to a second embodiment of the present invention will now be described while referring to FIGS. 5 and 6. FIG. 5 is a schematic cross-sectional view of the processing performed for the manufacturing method of the second embodiment. And FIG. 6 is a schematic cross-sectional view of a head substrate obtained by employing the manufacturing method of this embodiment.

The head substrate manufacturing method of this embodiment basically provides the same processing as the manufacturing method of the first embodiment. The only difference is the length of a period required for orientation-dependent anisotropic etching to form a recessed portion (a non-perforating hole) 26 that later becomes an ink supply port 14. Specifically, as illustrated in FIG. 5, orientation-dependent anisotropic etching is performed for a shorter period than in the first embodiment, and a second recessed portion 26 is formed. As a result, as illustrated in FIG. 6, compared with the ink supply port 14 (FIG. 2) obtained using the manufacturing method of the first embodiment, the ink supply port 14 has a more vertical trench structure. The other arrangement that corresponds to that previously described for the first embodiment will not be described by using the same reference numbers for FIGS. 5 and 6.

Third Embodiment

Figure 7:
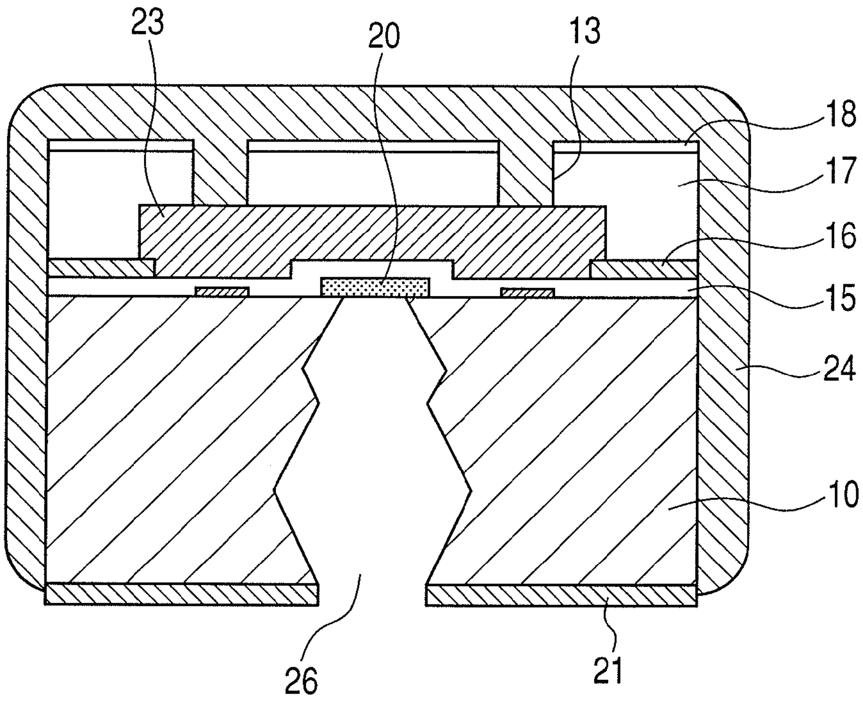
FIG. 7 is a schematic cross-sectional view of a head substrate produced by a head substrate manufacturing method according to a third embodiment of the present invention.

A head substrate manufacturing method according to a third embodiment of the present invention will now be described while referring to FIGS. 7 and 8. FIG. 7 is a schematic cross-sectional view of the processing performed by the manufacturing method of the third embodiment, and FIG. 8 is a schematic cross-sectional view of a head substrate obtained using the manufacturing method of the embodiment.

The head substrate manufacturing method of this embodiment provides the same processing as that of the first embodiment. The only difference is that the anisotropic etching process is performed in three steps to form a recessed portion (a non-perforating hole) 26 that will later be an ink supply port 14.

Specifically, according to the manufacturing method of the first embodiment, orientation-dependent anisotropic wet etching and anisotropic dry etching have been performed for the silicon substrate 10, in the named order, to form the second recessed portion 26. However, according to the manufacturing method of this embodiment, as illustrated in FIG. 7, after the anisotropic dry etching has been completed, orientation-dependent anisotropic wet etching is again performed and the second recessed portion 26 is formed. As a result, as illustrated in FIG. 8, an ink supply port 14 with the {111} plane exposed is obtained.

Figure 8:
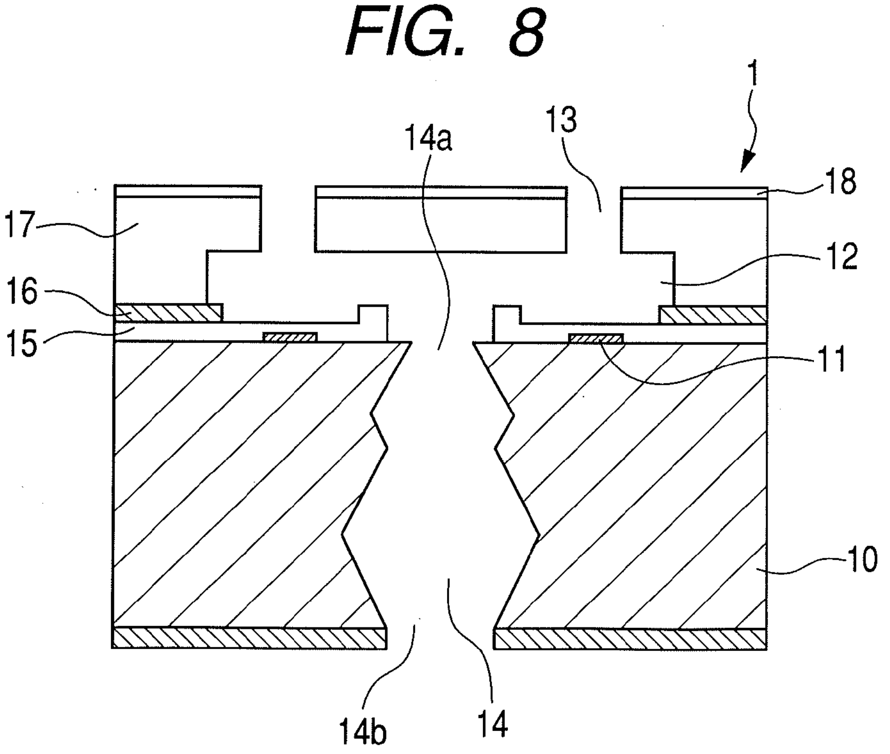
FIG. 8 is a schematic cross-sectional view of the processing performed using the head substrate manufacturing method according to the third embodiment.

The other arrangement that corresponds to that previously described in the first embodiment will not be described by using the same reference numerals for FIGS. 7 and 8.

Fourth Embodiment

In the above embodiments, a manufacturing method has been described for forming a head substrate having only one ink supply port. However, according to the head substrate manufacturing method of this invention, a head substrate having multiple ink supply ports can also be produced.

Figure 9:
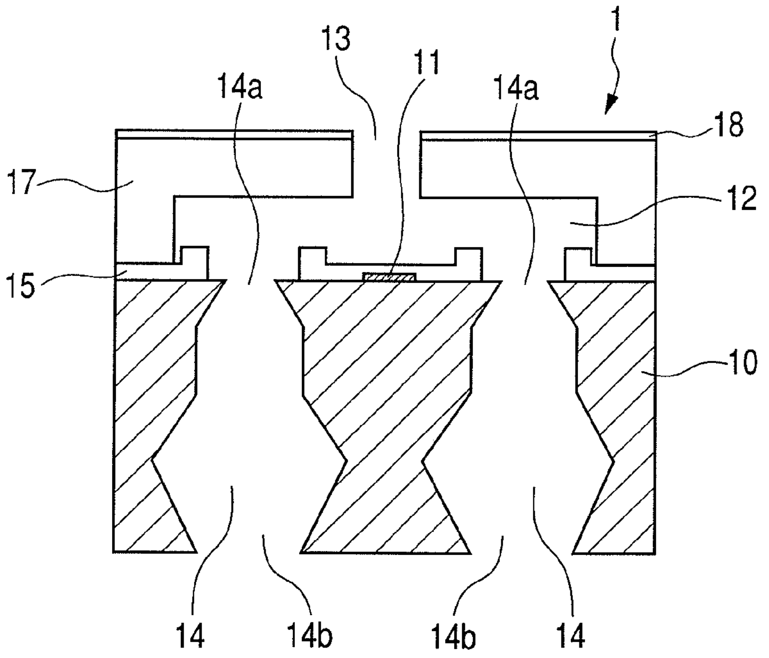
FIG. 9 is a schematic cross-sectional view of a head substrate produced by a head substrate manufacturing method according to a fourth embodiment of the present invention.

FIG. 9 is a schematic cross-sectional view of an inkjet head substrate 1 obtained by employing the head substrate manufacturing method described in the first embodiment of the invention. Six ink supply ports 14 are formed for the inkjet head substrate 1 in FIG. 9 by performing the processing as described in the first embodiment. Therefore, the processing for manufacturing the inkjet head substrate 1 illustrated in FIG. 9 should be easily understood by one having ordinary skill in the art that has had experience with the first embodiment. However, for caution's sake, only the process related to the formation of the ink supply ports 14 will be described while referring to FIGS. 10A and 10B. It should be noted that the structure that corresponds to that previously described for the first embodiment will not be described by using the same reference numerals for FIGS. 9, 10A and 10B.

Figure 10A:
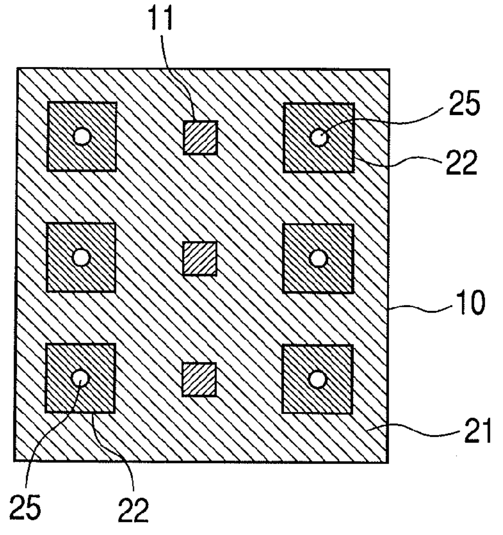
FIGS. 10A and 10B are schematic plan views of the processing performed using the head substrate manufacturing method according to the fourth embodiment.

FIG. 10A is a schematic plan view of the reverse face of a silicon substrate 10 in which non-perforating holes (guide holes 25) are formed. As illustrated in FIG. 1A, multiple openings 22 that will be reverse openings 14*b* of the ink supply ports 14 in FIG. 9 are formed in an etching mask 21 on the reverse face of the silicon substrate 10. This differs from the first embodiment where only one rectangular opening 22 is formed in the etching mask 21. Thereafter, the non-perforating guide holes 25 are formed, from the reverse to the obverse face of the silicon substrate 10, in the portions on the reverse of the silicon substrate 10 that are exposed through the openings 22 in the etching mask 21. At this time, the guide holes 25 are located in the centers of the openings 22.

Figure 10B:
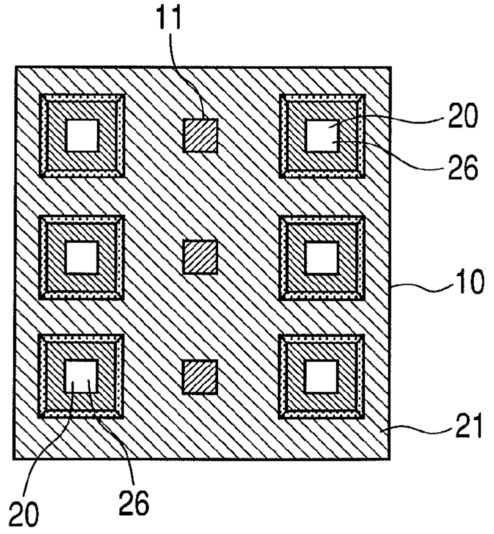
Figure 11:
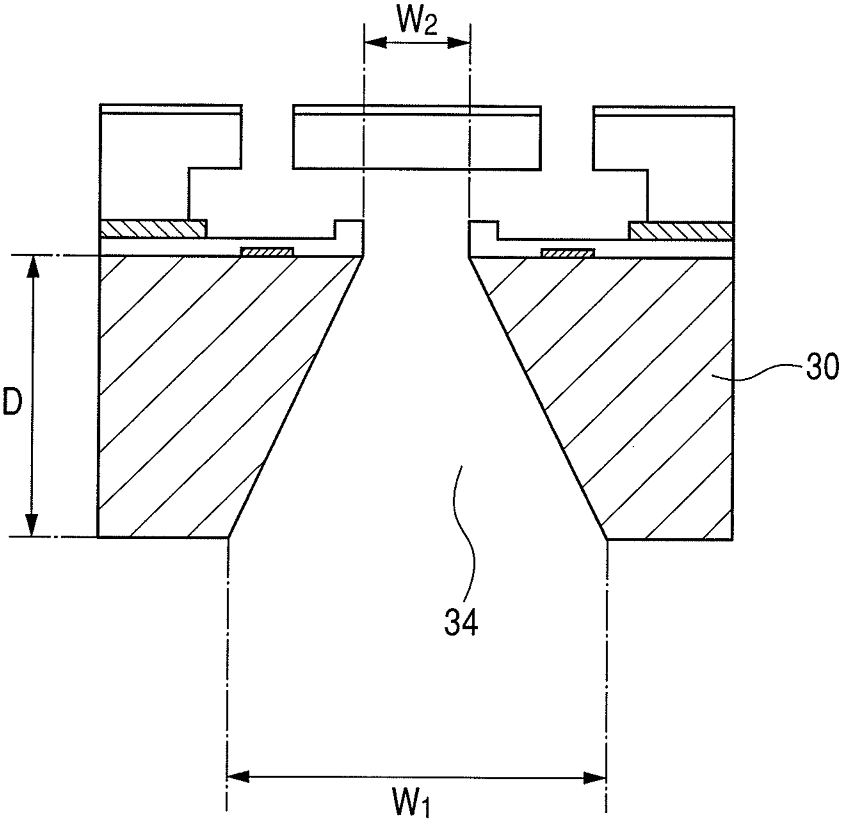
FIG. 11 is a schematic cross-sectional view of a head substrate produced using a conventional manufacturing method.

Then, the silicon substrate 10 where the guide holes 25 are formed is immersed in an etchant, and second recessed portions 26 are formed. Sequentially, thereafter, anisotropic dry etching is performed for the inner walls (bottoms) of the second recessed portions 26 toward the obverse face of the silicon substrate 10, so that the second recessed portions 26 penetrate the silicon substrate 10. At this time, as was previously described, a first passivation layer 20 serves as a stop layer. FIG. 10B is a schematic plan view of the reverse face of the silicon substrate 10 obtained by performing anisotropic dry etching using the first passivation layer 20 as a stop layer.

According to the head substrate manufacturing method of the fourth embodiment, multiple ink supply ports 14 can be formed for one energy generation element 11. When this method is employed, various nozzle designs, such as a design for an independent supply port or a design for sub-flow passageways, can be coped with to form an ink supply port.

In addition, since a wider color separation surface than conventional can be obtained between adjacent ink supply ports, the mixing of colors can be prevented when multiple colors are employed on one substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-231335, filed Sep. 6, 2007, which is hereby incorporated by reference herein in its entirety.

What is claimed is:

1. A manufacturing method, for a liquid discharge head substrate that includes a silicon substrate in which a liquid supply port is formed, comprising the steps of:

preparing the silicon substrate, on one face of which a mask layer, in which an opening has been formed, is deposited;

forming a first recessed portion in the silicon substrate, so that the first recessed portion is extended through the opening from the one face of the silicon substrate toward the other face, which is an opposite face of the one face, the first recessed portion ending in a terminus near the opposite face;

forming a second recessed portion by performing wet etching of the substrate, via the first recessed portion, using the mask layer; and performing dry etching of the silicon substrate in a direction from the second recessed portion to the other face, wherein D2>D–D1 is satisfied, where D2 is a depth obtained by the dry etching, D1 is a depth of the first recessed portion from the one face to the terminus and D is a thickness of the substrate, the depth D2 obtained by the dry etching being defined as a dimension from i) a position where the substrate is etched closest to the one face in the dry etching to ii) the other face, and the position where the substrate is etched closest to the one face in the dry etching step is closer to the one face than the terminus of the first recessed portion is to the one face.

2. The manufacturing method according to claim 1, wherein the first recessed portion is formed using a laser.

3. The manufacturing method according to claim 1, wherein the wet etching is orientation-dependent anisotropic wet etching.

4. The manufacturing method according to claim 1, wherein the dry etching is anisotropic dry etching.

5. The manufacturing method according to claim 1, wherein the dry etching is performed by employing the mask layer as a mask.

6. The manufacturing method according to claim 4, wherein the anisotropic dry etching is reactive ion etching.

7. The manufacturing method according to claim 1, wherein a metal layer is deposited on the other face of the substrate, and the dry etching is performed using the metal layer as a stop layer.

8. The manufacturing method according to claim 7, wherein the metal layer is formed of aluminum.

9. The manufacturing method according to claim 3, wherein the first recessed portion is formed using a laser.

10. The manufacturing method according to claim 2, wherein the wet etching is orientation-dependent anisotropic wet etching.

11. The manufacturing method according to claim 2, wherein the dry etching is anisotropic dry etching.

12. The manufacturing method according to claim 2, wherein the dry etching is performed by employing the mask layer as a mask.

13. The manufacturing method according to claim 11, wherein the anisotropic dry etching is reactive ion etching.

14. The manufacturing method according to claim 2, wherein a metal layer is deposited on the other face of the substrate, and the dry etching is performed using the metal layer as a stop layer.

15. The manufacturing method according to claim 14, wherein the metal layer is formed of aluminum.

* * * * *